US011904792B2

(12) United States Patent
Schneider et al.

(10) Patent No.: US 11,904,792 B2
(45) Date of Patent: Feb. 20, 2024

(54) SEAT-CENTRIC AIRBAG SYSTEM WITH ACTIVE PELVIS RESTRAINT

(71) Applicant: Autoliv ASP, Inc., Ogden, UT (US)

(72) Inventors: David W. Schneider, Waterford, MI (US); Christina Renee Morris, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 388 days.

(21) Appl. No.: 17/069,775

(22) Filed: Oct. 13, 2020

(65) Prior Publication Data

US 2022/0111818 A1    Apr. 14, 2022

(51) Int. Cl.
*B60R 21/2338* (2011.01)
*B60R 21/207* (2006.01)
*B60R 21/231* (2011.01)

(52) U.S. Cl.
CPC ........ *B60R 21/2338* (2013.01); *B60R 21/207* (2013.01); *B60R 21/23138* (2013.01); *B60R 2021/23146* (2013.01); *B60R 2021/23386* (2013.01); *B60R 2021/23388* (2013.01)

(58) Field of Classification Search
CPC .............. B60R 21/2338; B60R 21/207; B60R 21/23138; B60R 2021/23146; B60R 2021/23386; B60R 2021/23388; B60R 21/2334
See application file for complete search history.

(56) References Cited

U.S. PATENT DOCUMENTS

| 7,600,777 | B2 * | 10/2009 | Suzuki ................ B60R 21/2338 280/730.2 |
| 8,322,748 | B2 * | 12/2012 | Abe .................... B60R 21/2338 280/739 |
| 10,189,432 | B2 * | 1/2019 | Matsushita .......... B60N 2/4235 |
| 10,300,878 | B2 * | 5/2019 | Park ....................... B60R 21/207 |
| 10,336,283 | B2 * | 7/2019 | Rickenbach .......... B60R 21/233 |
| 10,759,376 | B2 * | 9/2020 | Jindal ..................... B60R 21/20 |
| 10,821,928 | B2 * | 11/2020 | Deng ................. B60R 21/23138 |
| 10,843,656 | B2 * | 11/2020 | Kobayashi ........ B60R 21/23138 |
| 10,981,533 | B2 * | 4/2021 | Kobayashi ........ B60R 21/23138 |
| 11,021,129 | B2 * | 6/2021 | Saito ................. B60R 21/23138 |

(Continued)

FOREIGN PATENT DOCUMENTS

WO   WO-2019121222 A1 *  6/2019
WO   WO-2023157634 A1 *  8/2023

OTHER PUBLICATIONS

WO-2023157634-A1 (Year: 2023).*
WO-2019121222-A1 (Year: 2019).*

*Primary Examiner* — Jason D Shanske
*Assistant Examiner* — Joselynn Y Sliteris
(74) *Attorney, Agent, or Firm* — Matthew D. Thayne; Thayne and Davis LLC

(57) ABSTRACT

Seat centric airbag restraint systems having pelvis restraint features, along with related methods. In some implementations, a first seat-mounted airbag cushion may be deployed along a first side of a vehicle occupant and a second seat-mounted airbag cushion may be deployed along a second side of the vehicle occupant. At least one wrap-around belt engaging at least one of the first and second seat-mounted airbag cushions may be released, either partially or fully, to inhibit forward translation of the vehicle occupant within a vehicle seat.

20 Claims, 9 Drawing Sheets

(56) References Cited

U.S. PATENT DOCUMENTS

| | | | |
|---|---|---|---|
| 11,110,883 B1* | 9/2021 | Deng | B60R 21/264 |
| 11,440,497 B2* | 9/2022 | Nagasawa | B60R 21/207 |
| 11,498,512 B2* | 11/2022 | Huf | B60R 21/231 |
| 2011/0309605 A1* | 12/2011 | Kumagai | B60R 21/239 |
| | | | 280/743.2 |
| 2019/0248322 A1* | 8/2019 | Herzenstiel | B60R 21/207 |
| 2019/0248323 A1* | 8/2019 | Saito | B60R 21/23138 |
| 2020/0391691 A1* | 12/2020 | Fischer | B60R 21/207 |
| 2021/0094499 A1* | 4/2021 | Deng | B60R 21/261 |
| 2021/0370863 A1* | 12/2021 | Gwon | B60R 21/264 |
| 2022/0089118 A1* | 3/2022 | Schneider | B60R 21/233 |
| 2022/0379833 A1* | 12/2022 | Shimizu | B60R 21/23138 |

\* cited by examiner

SEAT-CENTRIC AIRBAG SYSTEM WITH ACTIVE PELVIS RESTRAINT

SUMMARY

Many vehicle environments lack sufficient pelvis restraint that may be provided by, for example, knee bolsters and/or toe pans. Autonomous vehicles or vehicles with highly autonomous functions, such as highly automated driving (HAD) vehicles are particularly prone to having poor pelvis restraint. Thus, some restraint/safety systems designed for such vehicles may be particularly prone to restrain occupants.

For example, some systems deploy airbag cushions from the seat itself, rather than from a steering wheel or adjacent vehicle panel. Such systems may deploy belts known as "wrap-around belts" to provide a reaction surface to keep the airbags adjacent to the occupant during inflation. However, such systems are often prone to allowing the occupant's pelvis to shift forward during certain impact events, such as frontal impacts, particularly when the occupant is not restrained to the seat by a common seatbelt. This is due to the lack of sufficient restraint of the occupant's pelvis region during inflation and can lead to unnecessary occupant injuries.

The present inventors have therefore determined that it would be desirable to provide apparatus, systems and methods that overcome one or more of the foregoing limitations and/or other limitations of the prior art. In some embodiments, the inventive concepts disclosed herein may therefore provide a seat-centric and/or seat-deployed airbag system comprising one or more (typically, two) wrap-around belts to provide a reaction surface for the cushion(s), along with means for releasing, fully or partially, one or more of the belts so as to encourage pivoting/rotation of the occupant rather than forward translation during airbag deployment. Some embodiments may also provide for tensioning/retraction of a subset of the belts with simultaneous or sequential release of another subset of the belts, which may further improve deployment kinematics and thereby improve occupant safety.

In a more particular example of a seat-mounted airbag assembly, the assembly may comprise a first lateral cushion configured to deploy from a first side of a vehicle seat. The assembly may further comprise a first belt and/or belt portion coupled with the first lateral cushion and configured to tension the first lateral cushion during deployment. The assembly may further comprise a second lateral cushion configured to deploy from a second side of the vehicle seat opposite the first side, along with a second belt and/or belt portion coupled with the second lateral cushion and configured to tension the second lateral cushion during deployment.

The assembly may further comprise means for releasing, partially or fully, one or both of the first and second belt portions during deployment. In some embodiments, this release may prevent or at least inhibit forward translation of a vehicle occupant within the vehicle, in some cases by transferring occupant kinematics from forward translation, such as forward translation of at least one of the vehicle occupant's upper thighs and pelvis region, to rotational movement (upwards and rearward) within the vehicle seat.

In some embodiments, the assembly may comprise a tether. In some such embodiments, the means for releasing may comprise means for releasing at least one tether coupled with at least one of the first and second belt portions.

In some embodiments, the means for releasing may comprise a pyrotechnic actuator.

In some embodiments, the means for releasing may comprise a tether cutter, which may comprise a pyrotechnically-actuated tether cutter in some such embodiments.

The first belt portion and the second belt portion may, in some embodiments, comprise portions of a single, unitary belt that extends below the vehicle seat to allow for engagement with both the first lateral cushion and the second lateral cushion.

Some embodiments may further comprise a third belt portion configured to deploy adjacent to the first side of the vehicle seat at a location rearward of the first belt portion relative to the vehicle seat and a fourth belt portion configured to deploy adjacent to the second side of the vehicle seat a location rearward of the second belt portion relative to the vehicle seat. In some such embodiments, the third belt portion may be integral with the fourth belt portion and/or the first belt portion may be integral with the second belt portion.

In some embodiments, the means for releasing may be configured to release each of the belt portions simultaneously. Alternatively, one or more of the belt portions may be released sequentially with respect to one or more other belt portions.

In some embodiments, the means for releasing may be configured to release at least one of the belt portions separately from at least one of the other belt portions.

In another example of a seat-mounted airbag assembly according to other embodiments, the assembly may comprise a first lateral cushion configured to deploy from a first side of a vehicle seat and a second lateral cushion configured to deploy from a second side of the vehicle seat opposite the first side. The assembly may further comprise a first wrap-around belt configured to engage the first lateral cushion, extend below the vehicle seat, and engage the second lateral cushion during deployment. Means for releasing the first wrap-around belt may be provided to allow the first wrap-around belt to shift forward and/or upwards relative to the vehicle seat during deployment, which may allow the occupant to pivot/rotate upwards and/or rearward rather than translate forward during an impact event.

In some embodiments, the means for releasing may comprise a cutter configured to cut at least one of the first wrap-around belt and a tether coupled to the first wrap-around belt during deployment.

In some embodiments, the means for releasing may comprise a pyrotechnic actuator configured to facilitate releasing of the first wrap-around belt during deployment. The pyrotechnic actuator may, for example, actuate a cutting mechanism or a tether release mechanism.

Some embodiments may further comprise a second wrap-around belt configured to engage the first lateral cushion, extend below the vehicle seat, and engage the second lateral cushion during deployment. The second wrap-around belt may be positioned forward and/or inward of the first wrap-around belt. In some such embodiments, the means for releasing is configured to release both the first wrap-around belt and the second wrap-around belt simultaneously.

Some embodiments may further comprise a pretensioner coupled with at least one of the first wrap-around belt and the second wrap-around belt. The pretensioner may be configured to increase the tension on the first wrap-around belt as the second wrap-around belt is released, or vice versa. In addition, or alternatively, the pretensioner may be configured to remove slack from the wrap-around belt(s) that are released.

Some embodiments may comprise a weakened portion, such as a weakened portion in a tether coupled with the first wrap-around belt, which may be configured to sever the first wrap-around belt upon reaching a predetermined force threshold.

In an example of a method for restraining forward translation of a vehicle occupant during an impact event, the method may comprise deploying a first seat-mounted airbag cushion along a first side of a vehicle occupant and deploying a second seat-mounted airbag cushion along a second side of the vehicle occupant. The method may further comprise releasing at least one wrap-around belt engaging at least one of the first and second seat-mounted airbag cushions to inhibit forward translation of the vehicle occupant within a vehicle seat.

In some implementations, the at least one wrap-around belt may comprise a first wrap-around belt and a second wrap-around belt, wherein both the first wrap-around belt and the second wrap-around belt are configured to engage one or both of the first and second seat-mounted airbag cushions during deployment.

In some implementations, the step of releasing at least one wrap-around belt may comprise releasing the first wrap-around belt and the second wrap-around belt, which may take place either simultaneously or sequentially.

In some implementations, the step of releasing at least one wrap-around belt may comprise releasing the first wrap-around belt and increasing tension on the second wrap-around belt using a pretensioner. Additionally, or alternatively, the step of releasing at least one wrap-around belt may comprise releasing the first wrap-around belt and removing slack on the first wrap-around belt, which may also be done using a pretensioner if desired.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
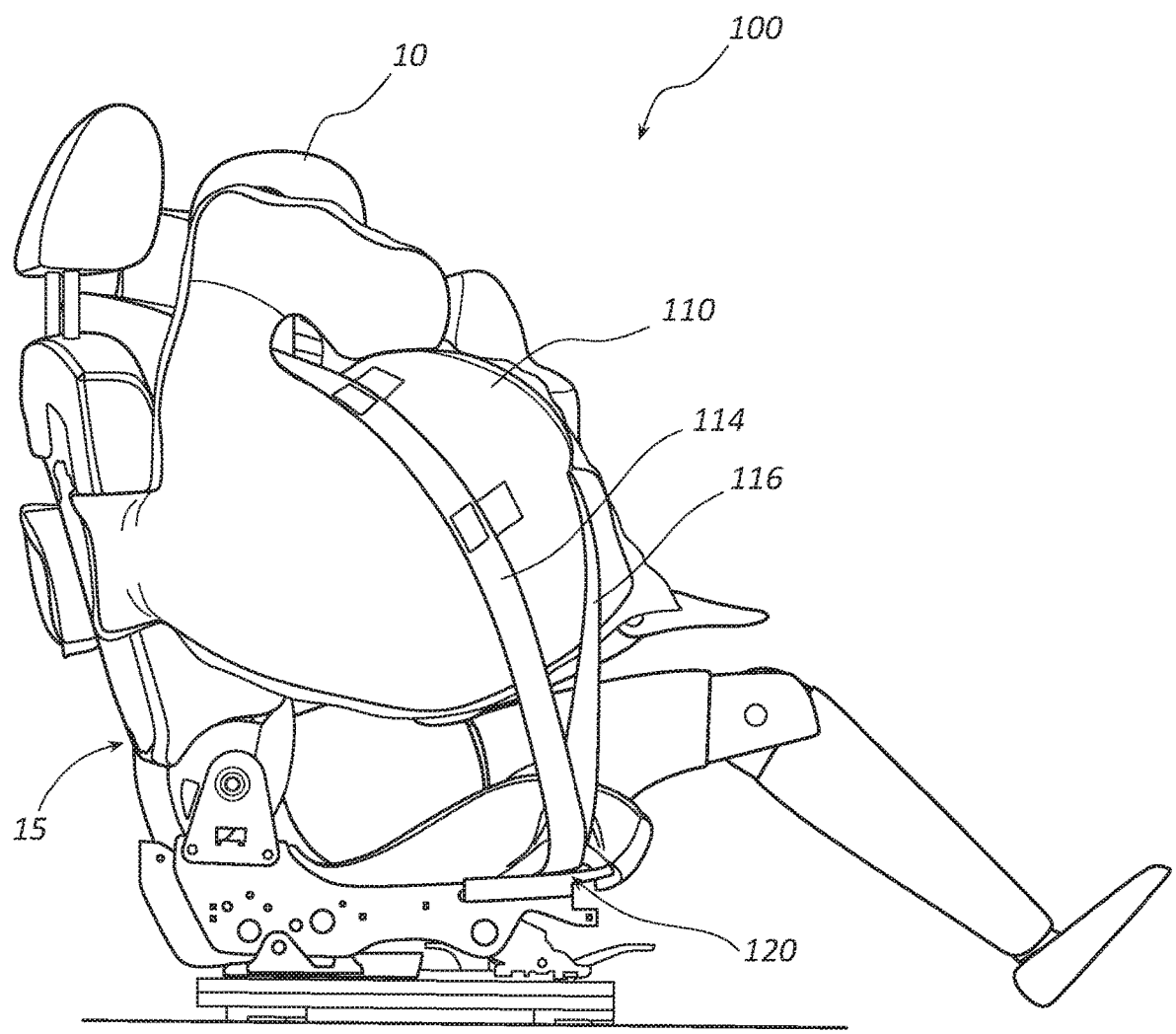
FIG. 1A is a side perspective view of a seat-mounted airbag cushion system having pelvis restraint according to some embodiments.
Figure 1B:
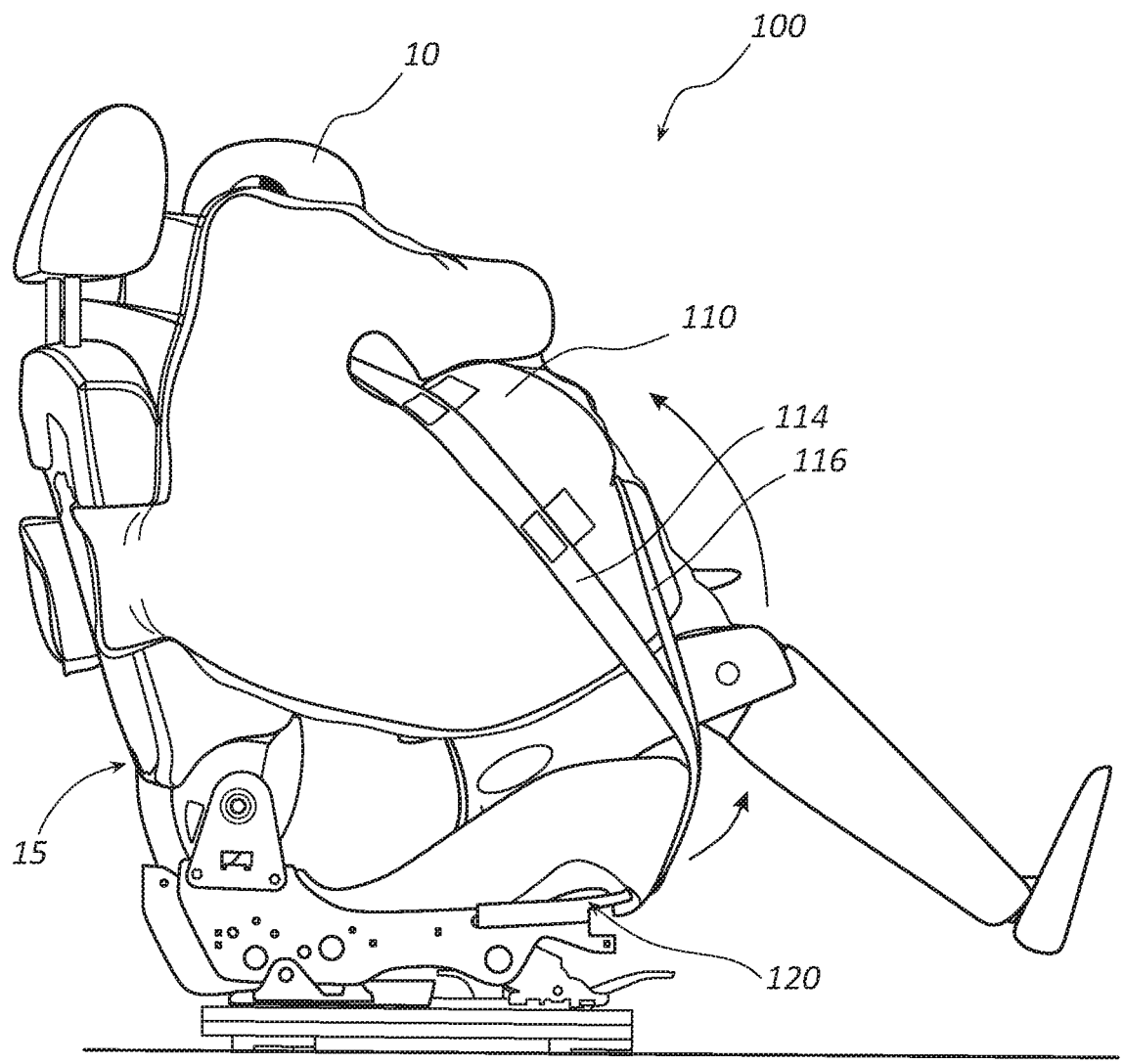
FIG. 1B is a side perspective view of the seat-mounted airbag cushion system of FIG. 1A following deployment of a belt releasing means.

FIGS. 1A and 1B depict a seat-centric airbag system 100 according to some embodiments. In certain preferred embodiments, system 100 may be used in a vehicle environment lacking effective pelvis restraint, such as restraint from a knee bolster and/or toe pan. For example, in some embodiments, system 100 may be installed in an autonomous or highly automated driving (HAD) vehicle.

Although only one side is visible in the figures, system 100 typically comprises a pair of airbag cushions configured to be deployed from, or from a position adjacent to, a vehicle seat 15 for a vehicle occupant 10, such as from behind vehicle seat 15, as shown in FIGS. 1A and 1B. Thus, a cushion 110 is shown following deployment on the right side of occupant 10 in FIG. 1A. Again, it will typically be the case that another similar cushion would be deployed from the left side of occupant 10 but is not shown in the figure to facilitate depiction of the belt releasing means and their functionality, as described herein.

One or more belts or "wrap-around belts" may be used to provide a reaction surface to ensure that the adjacent airbag cushion(s) 110 have a reaction surface and sufficient tension during deployment of the cushion(s) 110. Examples of wrap-around belts that may be used in one or more of the embodiments disclosed herein can be found in U.S. Patent Application Publication No. 2017/0259774 titled "Vehicle Occupant Restraint Device," the entire contents of which are incorporated herein by reference.

More particularly, in the depicted embodiment, two belts are depicted, namely, a lower or rearward belt 114 and an upper or forward belt 116. In some embodiments, belts 114 and 116 may extend underneath seat 15 and also engage the aforementioned cushion on the left side of occupant 10 that is not shown in the figures. However, it is contemplated that, in other embodiments, separate belts may be used on either side of assembly/system 100. The upper ends of belts 114/116 may be coupled to the upper end of the seat, as those of ordinary skill in the art will appreciate. Belts 114/116 may, in some embodiments, be coupled together below seat 15 or may be coupled to seat 15 at adjacent locations. Similarly, belts 114/116 may be coupled together at their respective upper ends or may be coupled at separate locations, preferably adjacent to one another.

The belts may be retractably mounted at the top and/or bottom, and may include various pre-tensioners, load limiters, or the like to ensure that they provide a sufficient length to allow proper deployment yet inhibit further retraction to ensure that they maintain tension on the adjacent cushions 110. In addition, it should be understood that any of belts 114/116 may be coupled to a portion of its respective cushion 110 in order to ensure proper deployment. This coupling may be rigid or may be done by way of a slidable coupling, such as by way of a slidable clip or the like.

A means for releasing 120 a belt or belt portion during deployment to inhibit forward translation of a vehicle occupant 10 within a vehicle may also be included. In the depicted embodiment, releasing means 120, several specific examples of which are discussed in greater detail below, may be positioned below or otherwise adjacent to a lower portion of seat 15.

As shown in FIG. 1B, upon release of one or both belts 114/116, instead of translating forward in seat 15, the kinematics of occupant 10 during an impact event may be changed occupant kinematics from forward pelvis and/or upper thigh translation to rotation of the pelvis and/or upper thigh, thereby maintaining restraint to seat 15. This is due to the release enabling the belts 114/116 to slide and/or rotate upward and/or forward, thereby pivoting around the upper attachments of belts 114/116 to the back and/or top of seat 15, as indicated by the arrow in FIG. 1B.

In some embodiments, one or both of belts 114/116 may be fully released to allow them to exit from underneath seat 15. In other embodiments, one or both of belts 114/116 may be partially released to allow the respective belt(s) to slide forward and/or upward but maintain a coupling with seat 15. Thus, in the embodiment depicted in FIG. 1B, both belts are partially released to allow for the aforementioned sliding/pivoting to inhibit forward translation of occupant 10, but a coupling with seat 15 is maintained following deployment.

Figure 2A:
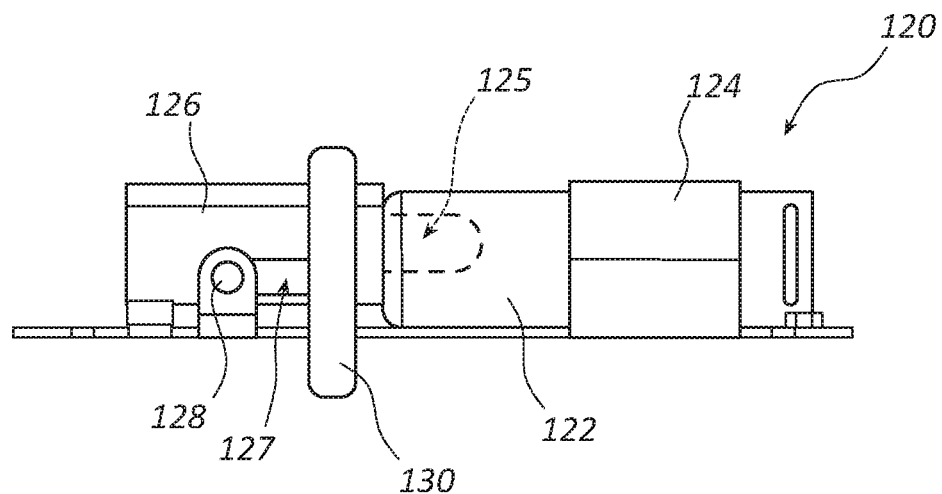
FIG. 2A is a side elevation view of a belt releasing means comprising a pyrotechnic tether releasing mechanism shown prior to deployment.
Figure 2B:
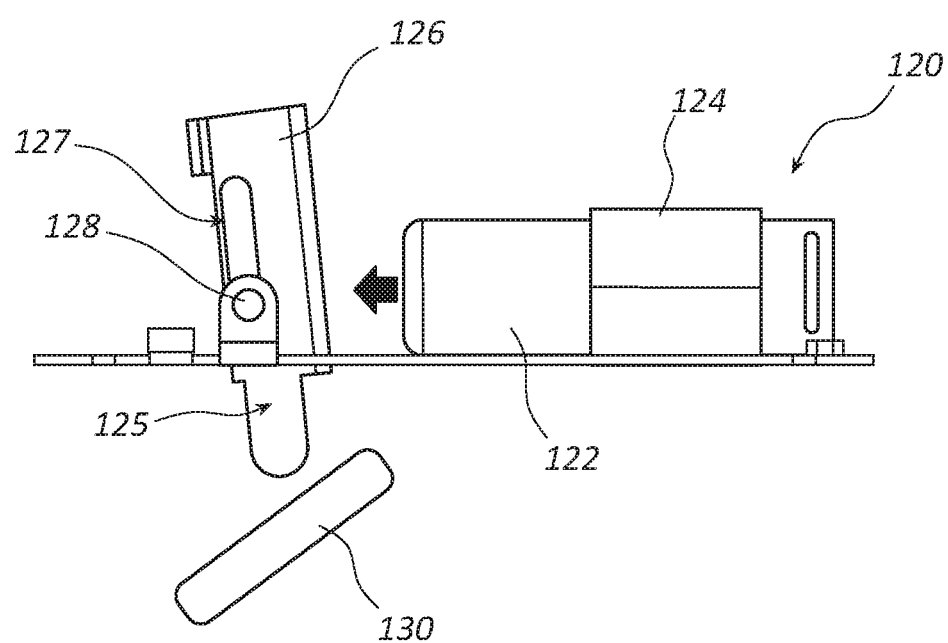
FIG. 2B is a side elevation view of the belt releasing means of FIG. 2A shown following deployment to release the tether.

FIGS. 2A and 2B illustrate a more specific example of a releasing means 120. Releasing means 120 comprises a pyrotechnic-actuated tether release. Thus, in some embodiments, rather than directly releasing one or both belts 114/116, a tether 130 may be coupled to one or both belts 114/116 and the tether 130 may be released by the releasing means, thereby releasing the belt(s).

Pyrotechnic-actuated release mechanism 120 comprises a pyrotechnic actuator 122, which may be held in place with bracket 124. A piston may be moved by pyrotechnic actuator 122, which may force a retainer arm 125 coupled with a slidable tether support member 126, out of an opening formed in a housing of pyrotechnic actuator or another device to which pyrotechnic actuator 122 is coupled.

Tether support member may further comprise an elongated slot 127 configured to slidably receive a pin 128 or the like. Thus, upon actuation of pyrotechnic actuator 122, tether support member 126 can slide (to the left from the perspective of the figures) to allow retainer arm 125 to be released.

As shown in FIG. 2B, tether support member 126 may also be rotatably coupled to pin 128. This allows for rotation of retainer arm 125 once it has been released. Due to the tension on the belt(s) coupled with tether 130, this force may then cause retainer arm 125 to rotate and allow tether 130 to slide off retainer arm 125 and be released.

FIGS. 3A-3D illustrate another example of a releasing means 220. Releasing means 220 comprises a tether cutter, which may also be pyrotechnically actuated. Thus, tether cutter 220 comprises a pyrotechnic actuator 222. In some embodiments, pyrotechnic actuator 222 may comprise a "redrawn initiator" having a redrawn end that is rolled back inside itself and is configured to unrolls and extend during deployment, thereby providing the force necessary to actuate a blade/cutter, as described below. Such "redrawn" initiators have been disclosed and described in greater detail in U.S. Pat. No. 7,063,019 filed Dec. 5, 2003 and titled "Assemblies including extendable, reactive charge-containing actuator devices." The disclosure of this patent is hereby incorporated by reference in its entirety.

Figure 3A:
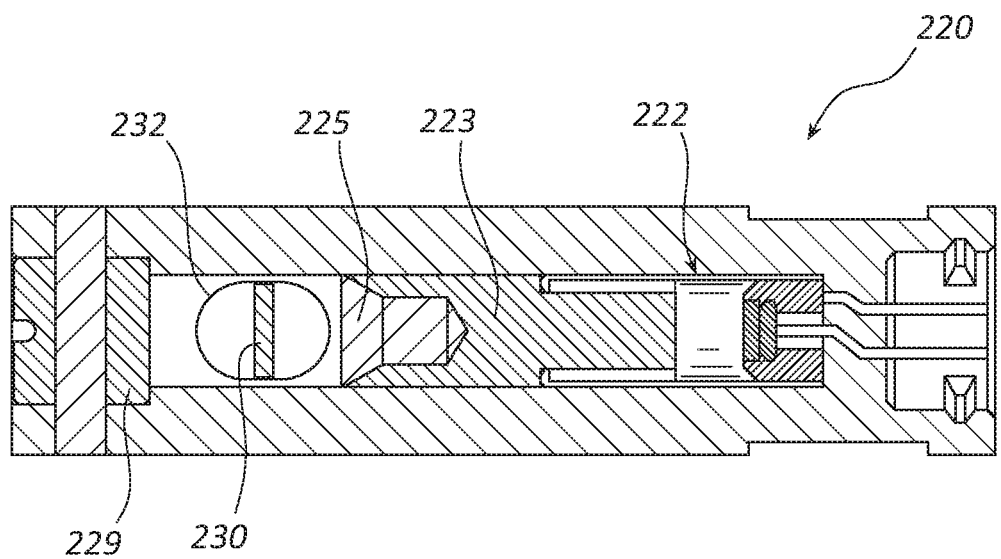
FIG. 3A is a cross-sectional view of a belt releasing means according to another embodiment comprising a tether cutter shown prior to deployment.
Figure 3B:
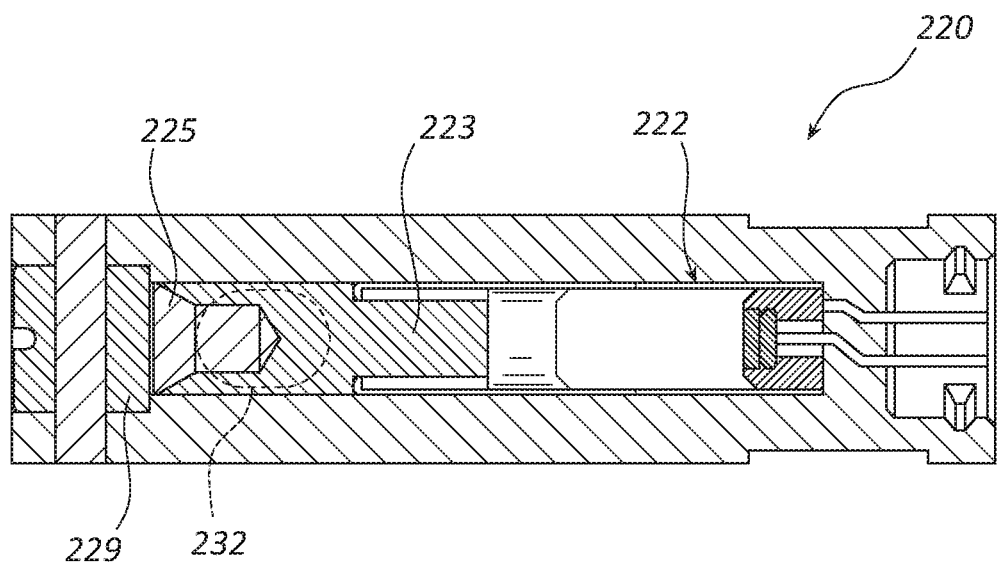
FIG. 3B is a cross-sectional view of the belt releasing means of FIG. 3A following deployment to cut the tether.
Figure 3C:
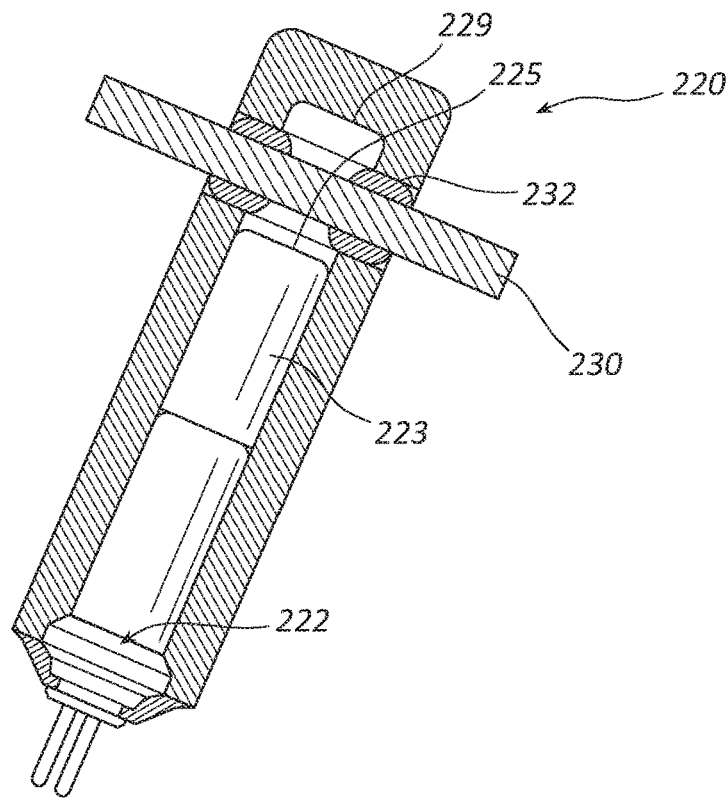
FIG. 3C is another view of the belt releasing means of FIGS. 3A and 3B shown prior to deployment.
Figure 3D:
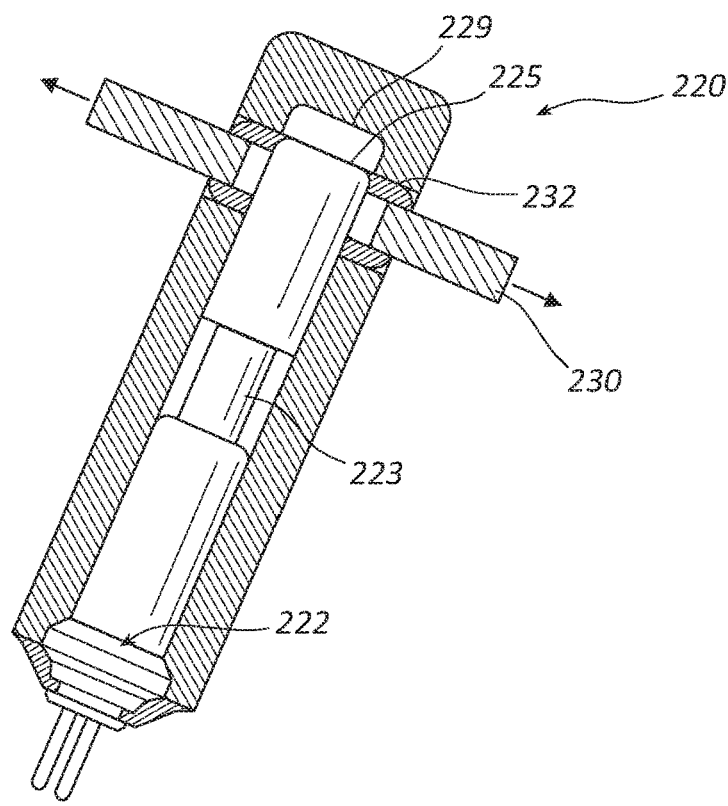
FIG. 3D depicts the belt releasing means of FIG. 3C following deployment.

A piston 223 having a blade 225 positioned on a distal tip thereof may be slidably positioned within a chamber of the device. By operably coupling piston 223 with initiator 222, another pyrotechnic device, or another suitable actuation device, blade may be configured to cut a tether 230, which extends through an opening 232 formed in the device, as shown in FIGS. 3B and 3D. Although in the depicted embodiment it is contemplated that tether 230 may be coupled to a belt (not shown), it is also contemplated that, in alternative embodiments, one or more belts may be cut directly using cutter 220 or another similar device, if desired. A stop element 229 may be used to provide a means for confining blade 225 at the distal end of its path within cutter 220.

Figure 4A:
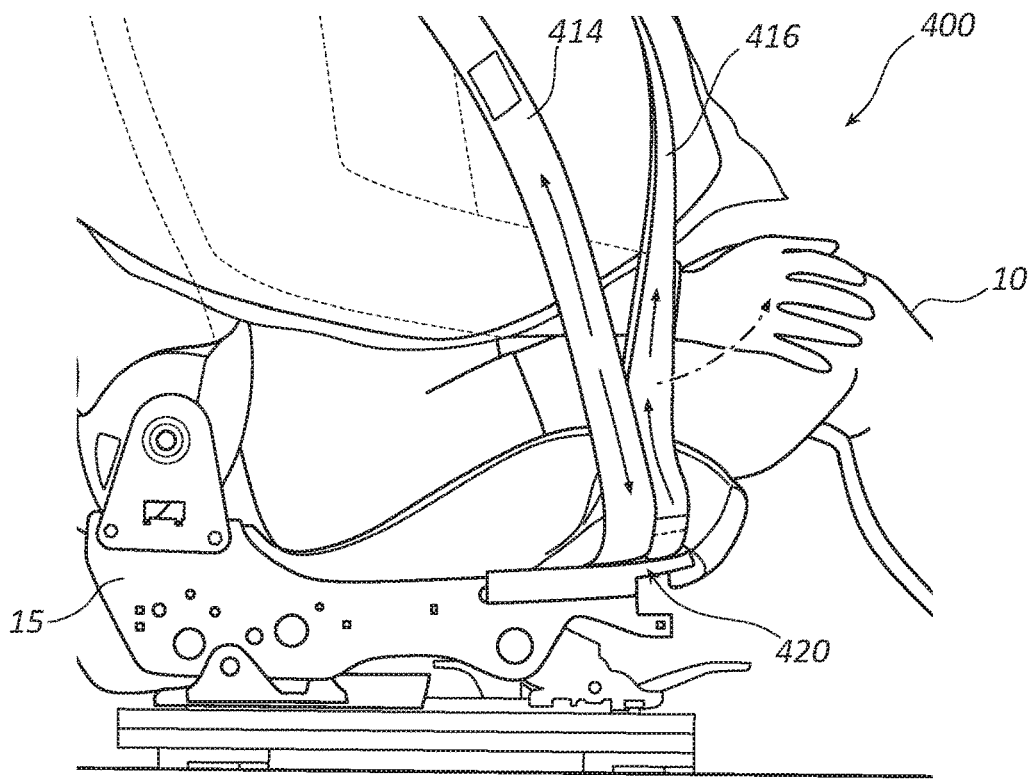
FIG. 4A is a side perspective view of a seat-mounted airbag cushion system according to other embodiments.
Figure 4B:
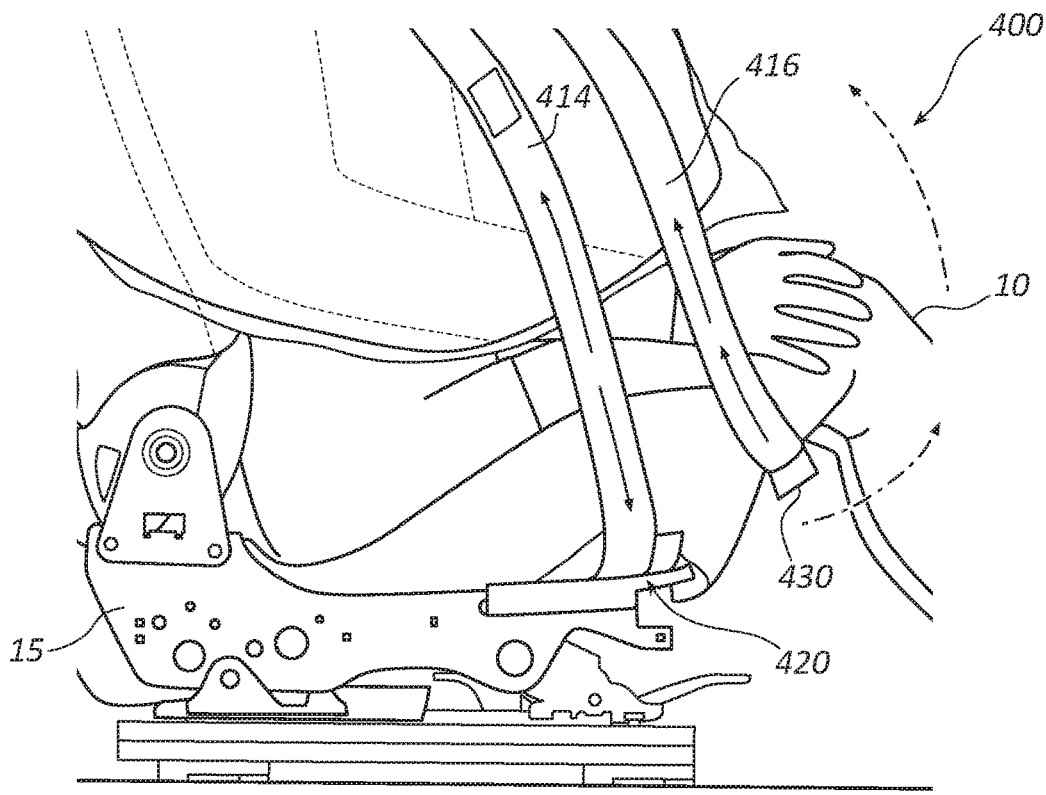
FIG. 4B depicts the seat-mounted airbag cushion system of FIG. 4A following deployment of a belt releasing means to release one of the belts restraining one or more of the seat-mounted airbag cushions.

FIGS. 4A and 4B depict another embodiment of a seat-mounted airbag assembly 400 comprising belt releasing means 420, the precise details of which are not shown in the figures but may comprise any of the more specific belt releasing means disclosed herein. In this embodiment, only upper/forward belt 416 is released and the coupling of lower/rearward belt 414 to seat 15 is maintained. For some embodiments, it may be beneficial to release only the upper (forward) belt 416 to provide the pelvis restraint function (changing the forward translation to occupant rearward rotation), while maintaining the connection of the lower (rearward) belt 414 to the seat 15 to provide continued tension in this belt 414 to stabilize the cushion(s) 410 and provide the necessary support for restraining the occupant 10. Again, it should be understood that, typically, belts 414/416, other similar belts or belt portions, would also extend to the opposite side of the occupant 10 and engage another inflatable cushion. Thus, in preferred embodiments, releasing of belt 416 (or, in other embodiments, belt 414 or both belts 414 and 416) would result in a similar effect on the opposite side not shown in these figures.

In addition, although belt 416 (and/or belt 414 in other embodiments) may be released directly, in the depicted embodiment, a tether 430 coupled to belt 416 is released to release belt 416 rather than releasing belt 416 directly. Again, in any of the embodiments disclosed herein, a tether may be used to accomplish the coupling/releasing if desired.

Figure 5A:
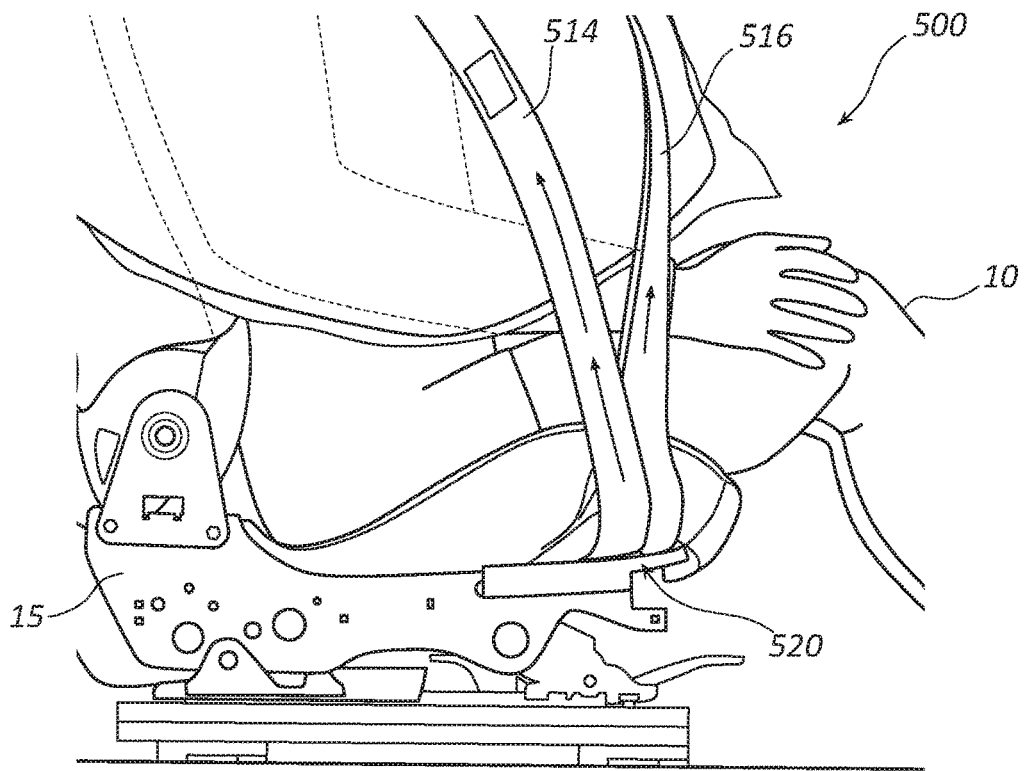
FIG. 5A is a side perspective view of a seat-mounted airbag cushion system according to still other embodiments.
Figure 5B:
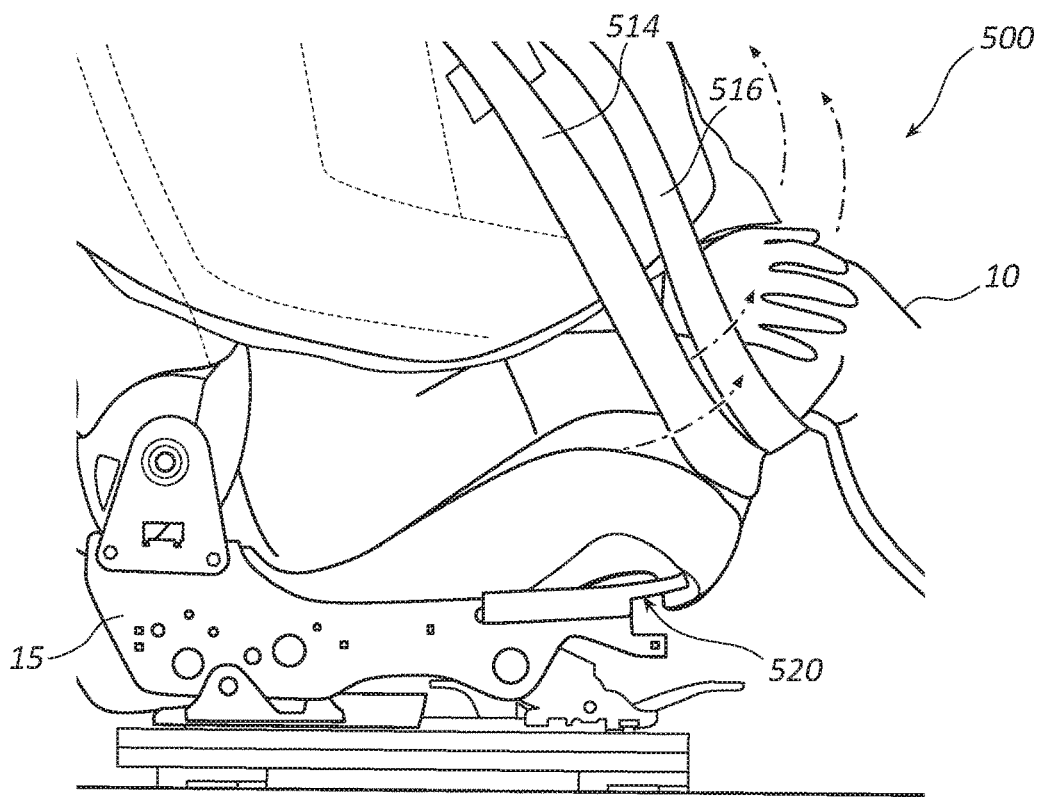
FIG. 5B depicts the seat-mounted airbag cushion system of FIG. 5A following deployment of a belt releasing means to release two belts restraining one or more of the seat-mounted airbag cushions.

As previously mentioned, however, in other embodiments, both belts 414/416 may be released, either simultaneously or sequentially. Thus, another embodiment of a seat-mounted airbag assembly 500 is depicted in FIGS. 5A and 5B that may allow for release of both belts in either such manner as desired. As with other embodiments, assembly 500 comprises a belt releasing means 520, which may comprise any of the specific belt releasing means disclosed herein. As shown in FIG. 5B, both belt 514 and belt 516 have been released.

In some embodiments, these belts may be released together/simultaneously. Thus, a single belt releasing means 520 may be used to release both belts 514/516 in such embodiments. However, in alternative embodiments, an intentional delay may be built into release of one of the belts before the other. Thus, it is contemplated that separate belt releasing means may be provided for each belt or, alternatively, a single device having two actuators, or a staged actuator may be used.

In embodiments incorporating an intentional delay between release of belts 514/516, the delay time between the two releases may depend upon several factors, including crash pulse severity and angle, belted vs. unbelted occupant status, occupant size, etc. For example, in some embodiments, system 500 may be configured to provide for a delay between release of the belts, or no delay, depending upon detection of one or more of these parameters by various sensors in the vehicle. There may, for example, be no release for either belt 514/516 if the occupant 10 is belted and does not need additional pelvis restraint. If a delay is needed or otherwise incorporated into the system, the delay may be, for example, between about 20 ms and about 30 ms. Typically, this delay would be incorporated such that the forward/upper belt 516 is released before the rearward/lower belt 514.

Figure 6A:
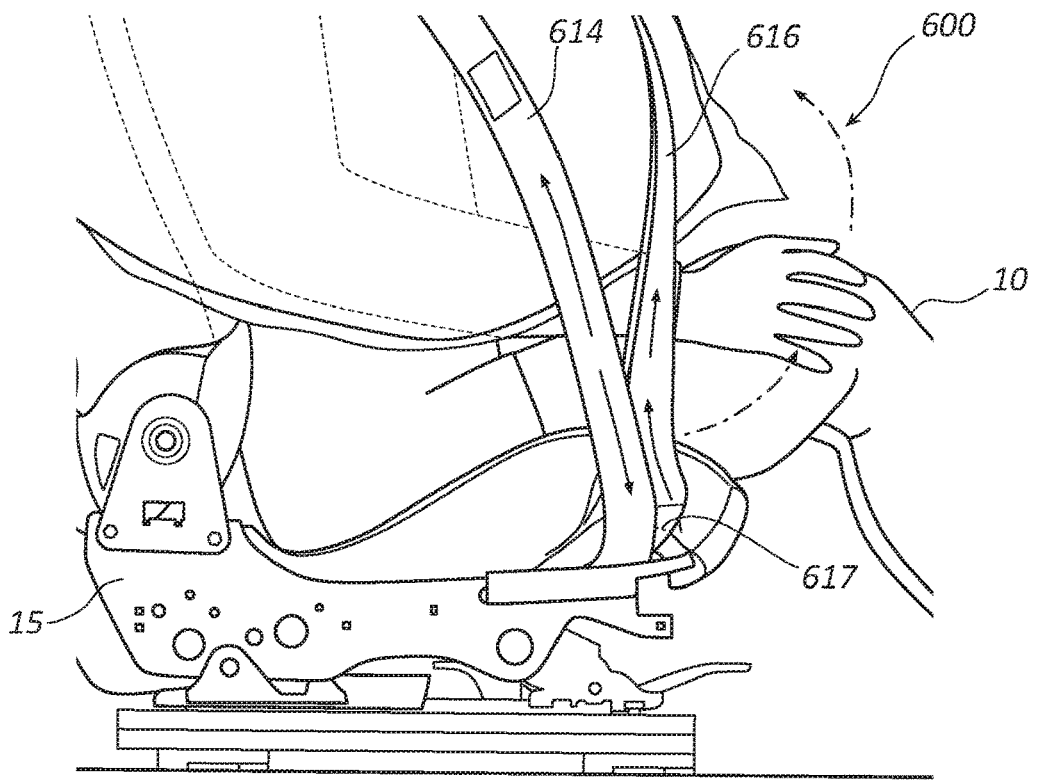
FIG. 6A is a side perspective view of a seat-mounted airbag cushion system according to further embodiments.
Figure 6B:
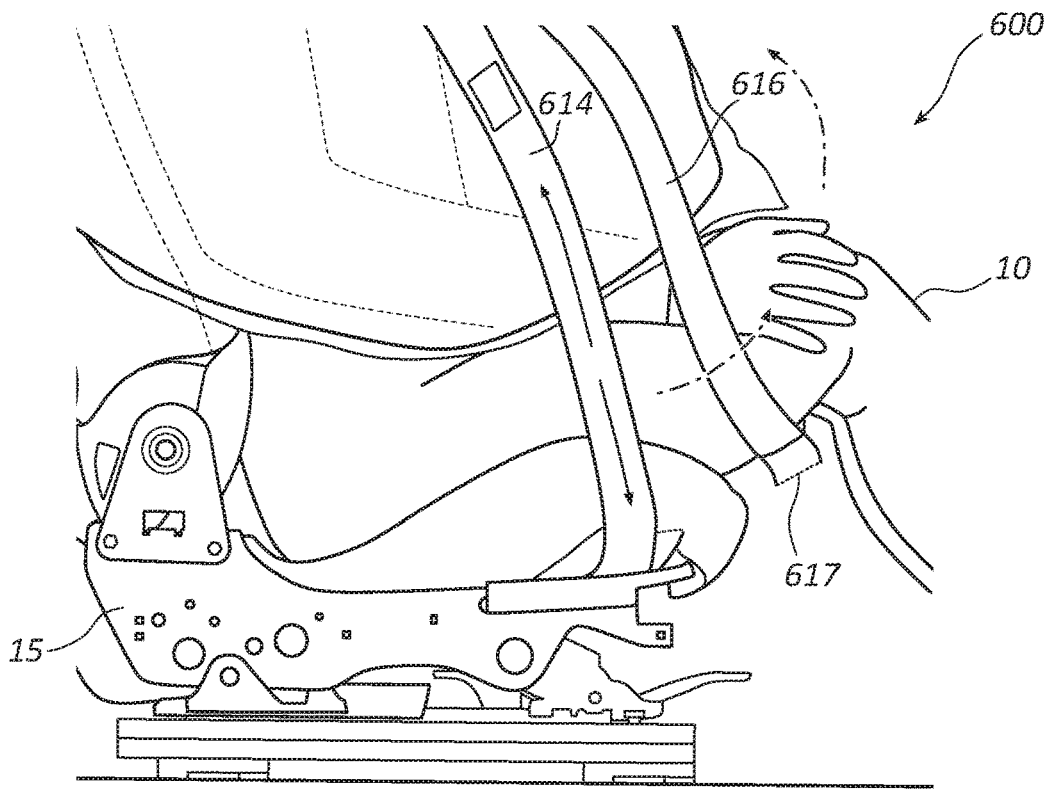
FIG. 6B depicts the seat-mounted airbag cushion system of FIG. 6A following deployment of a belt releasing means comprising a weakened portion formed along one of the belts to sever the belt upon experiencing a threshold force during deployment.

Another example of a seat-mounted airbag assembly 600 is shown in FIGS. 6A and 6B. Again, this system uses a pair of wrap-around belts 614/616 to provide a reaction surface and tension against one or more adjacent inflatable cushions. However, in this embodiment, the releasing means comprises a mechanically actuated means that may provide for belt release adaptively without sensor inputs, such as a means for releasing that takes place upon reaching a predetermined force threshold in the belt or belts being released. More specifically, the tether releasing means of assembly/system 600 comprises a weakened portion 617, which is shown formed on outer/upper belt 616 but may be additionally, or alternatively, formed on inner/lower belts 614 in other embodiments. FIG. 6B depicts belt 616 following severing of weakened portion 617, which, again, may be formed in the belt itself but more preferably is formed in a tether coupled to belt 616.

Weakened portion 617 may comprise, for example, a tear seam, tear stitching, perforations, or any other suitable force-actuated feature in the belt(s) and/or a tether coupled to the belt(s) that releases under a load that is expected to be experienced during airbag deployment and provides the desired release of the belt from the seat attachment.

In some embodiments, instead of complete release of belt 616, an optional load-limiting feature may be used to increase the effective length of belt 616 once the threshold force has been reached. This feature may, in some embodiments, be in the form of a bending element or torsion bar, similar to features used in load-limiting seat belt retractors. Other features that enable controlled elongation or pay-out of a webbing or accompanying tether may also be used.

Figure 7A:
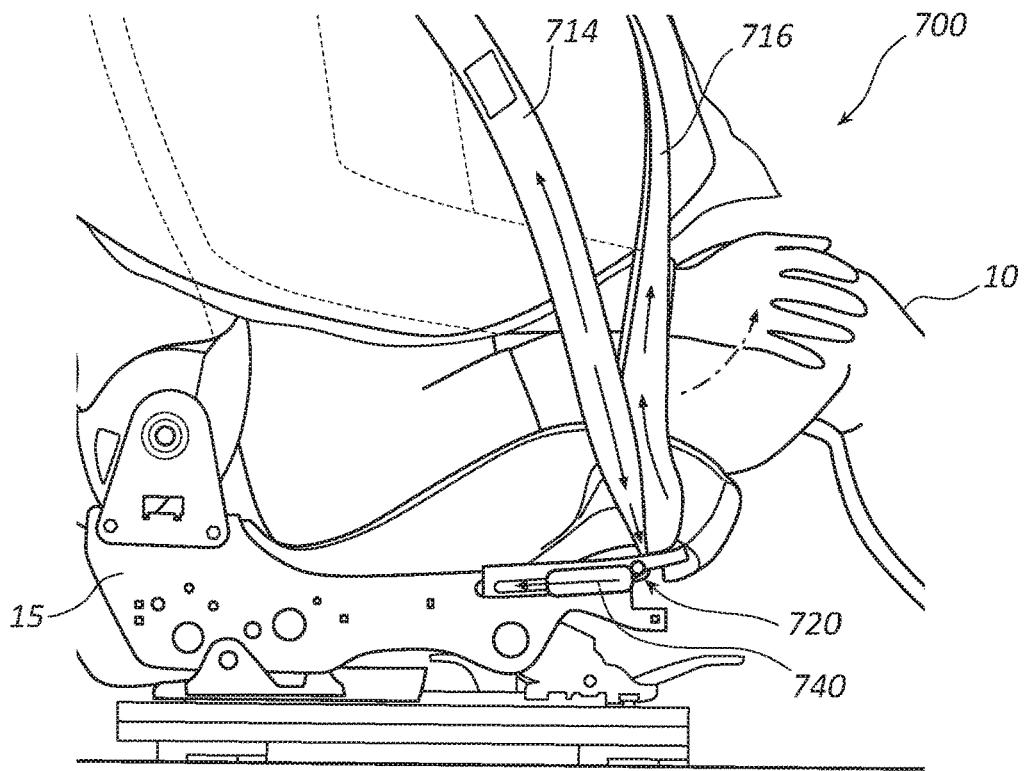
FIG. 7A is a side perspective view of a seat-mounted airbag cushion system according to yet other embodiments.
Figure 7B:
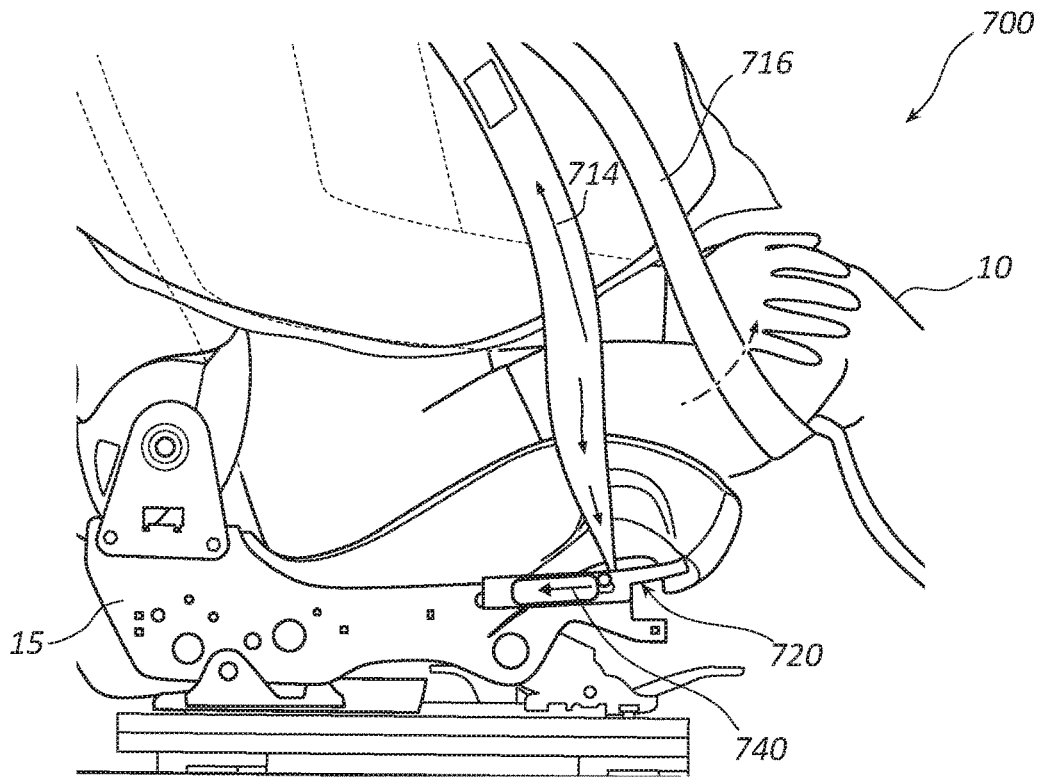
FIG. 7B depicts the seat-mounted airbag cushion system of FIG. 7A following deployment of a belt releasing means and a pretensioner.

Yet another embodiment of a seat-mounted airbag assembly 700 is depicted in FIGS. 7A and 7B. In this embodiment, belt 716 is released using a belt releasing means 720, as shown in FIG. 7B, and belt 714 is retracted using a pretensioner 740, as indicated by the arrows in both figures. Pretensioner 740, which may comprise a typical seatbelt pretensioner or a pre-tensioning retractor, is configured to increase the tension on belt 714 as belt 716 is released. The additional tensioning provided by pretensioner 740 may take place simultaneously with respect to the release of belt 716 or sequentially. For example, pretensioning may take place slightly before release of belt 716 in some embodiments.

In addition, in some embodiments, pre-tensioning and/or slack reduction may take place in the released belt. In some such embodiments, the pre-tensioning or length/slack reduction of the wrap-around belt may take place at the top of the seat back rather than the bottom as illustrated in the drawings. This may enable the wrap-around belt to separate from below the seat and be pulled upward/rearward in an arc-like motion, lifting the thighs as the occupant translates forward.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A seat-mounted airbag assembly, comprising:
a first lateral cushion configured to deploy adjacent to a first side of a vehicle seat;
a first wrap-around belt portion coupled with the first lateral cushion and configured to tension the first lateral cushion along an exterior surface of the first lateral cushion during deployment;
a second lateral cushion configured to deploy adjacent to a second side of the vehicle seat opposite the first side;
a second wrap-around belt portion coupled with the second lateral cushion and configured to tension the second lateral cushion along an exterior surface of the second lateral cushion during deployment; and
means for releasing at least one of the first and second belt portions during deployment, wherein the means for releasing is configured to release a lower portion of the first belt portion and/or the second belt portion under the vehicle seat allow one or both of the first and second belt portions to shift forward relative to the vehicle seat during deployment.

2. The seat-mounted airbag assembly of claim 1, further comprising at least one tether coupled with at least one of the first and second belt portions, and wherein the means for releasing comprises means for releasing the at least one tether coupled with at least one of the first and second belt portions.

3. The seat-mounted airbag assembly of claim 2, wherein the means for releasing comprises a pyrotechnic tether release actuator.

4. The seat-mounted airbag assembly of claim 2, wherein the means for releasing comprises a tether cutter.

5. The seat-mounted airbag assembly of claim 1, wherein the first belt portion and the second belt portion are portions of a single, unitary belt that extends below the vehicle seat to allow for engagement with both the first lateral cushion and the second lateral cushion.

6. The seat-mounted airbag assembly of claim 5, further comprising:
a third belt portion configured to deploy adjacent to the first side of the vehicle seat at a location rearward of the first belt portion relative to the vehicle seat; and
a fourth belt portion configured to deploy adjacent to the second side of the vehicle seat at a location rearward of the second belt portion relative to the vehicle seat.

7. The seat-mounted airbag assembly of claim 6, wherein the means for releasing is configured to release each of the belt portions simultaneously.

8. The seat-mounted airbag assembly of claim 6, wherein the means for releasing is configured to release at least one of the belt portions separately from at least one of the other belt portions.

9. A seat-mounted airbag assembly, comprising:
a first lateral cushion configured to deploy from a first side of a vehicle seat;
a second lateral cushion configured to deploy from a second side of the vehicle seat opposite the first side;
a first wrap-around belt configured to engage the first lateral cushion, extend below the vehicle seat, and engage the second lateral cushion during deployment; and
means for releasing the first wrap-around belt to allow the first wrap-around belt to shift forward relative to the vehicle seat during deployment.

10. The seat-mounted airbag assembly of claim 9, wherein the means for releasing comprises a cutter configured to cut at least one of the first wrap-around belt and a tether coupled to the first wrap-around belt during deployment.

11. The seat-mounted airbag assembly of claim 9, wherein the means for releasing comprises a pyrotechnic actuator configured to facilitate releasing of the first wrap-around belt during deployment.

12. The seat-mounted airbag assembly of claim 9, further comprising a second wrap-around belt configured to engage the first lateral cushion, extend below the vehicle seat, and engage the second lateral cushion during deployment.

13. The seat-mounted airbag assembly of claim 12, wherein the means for releasing is configured to release both the first wrap-around belt and the second wrap-around belt simultaneously.

14. The seat-mounted airbag assembly of claim 12, further comprising a pretensioner coupled with at least one of the first wrap-around belt and the second wrap-around belt, wherein the pretensioner is configured to increase the tension on the at least one of the first wrap-around belt and the second wrap-around belt as the other of the first wrap-around belt and the second wrap-around belt is released.

15. The seat-mounted airbag assembly of claim 9, wherein the means for releasing comprises a weakened portion configured to sever the first wrap-around belt upon reaching a predetermined force threshold.

16. The seat-mounted airbag assembly of claim 15, wherein the weakened portion comprises a tear seam.

17. A method for restraining forward translation of a vehicle occupant during an impact event, the method comprising the steps of:
deploying a first seat-mounted airbag cushion along a first side of a vehicle occupant;
deploying a second seat-mounted airbag cushion along a second side of the vehicle occupant; and
releasing at least one wrap-around belt engaging an exterior surface of at least one of the first and second seat-mounted airbag cushions to allow the at least one wrap-around belt to shift forward relative to a vehicle seat within which the vehicle occupant is positioned during deployment and thereby inhibit forward translation of the vehicle occupant within the vehicle seat.

18. The method of claim 17, wherein the at least one wrap-around belt comprises a first wrap-around belt and a second wrap-around belt, wherein both the first wrap-around belt and the second wrap-around belt are configured to engage one or both of the first and second seat-mounted airbag cushions during deployment.

19. The method of claim 18, wherein the step of releasing at least one wrap-around belt comprises releasing the first wrap-around belt and the second wrap-around belt.

20. The method of claim 18, wherein the step of releasing at least one wrap-around belt comprises either releasing the first wrap-around belt and increasing tension on the second wrap-around belt using a pretensioner or releasing the first wrap-around belt and increasing tension on the first wrap-around belt using a pretensioner.

* * * * *